(12) United States Patent
Lee et al.

(10) Patent No.: US 6,420,440 B1
(45) Date of Patent: Jul. 16, 2002

(54) METHOD FOR RECYCLING ALIGNMENT LAYER MATERIALS

(75) Inventors: Bong-Woo Lee; Soo-Won Lee, both of Choongcheongnam-do; Sho-Hak Nam, Kyungki-do; Jin-Ho Ju; Soo-Im Jeong, both of Seoul; Hong-Sick Park; Sung-Chul Kang, both of Kyungki-do, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/556,299

(22) Filed: Apr. 24, 2000

(30) Foreign Application Priority Data

Mar. 12, 1999 (KR) ............................................. 99-54873

(51) Int. Cl.⁷ ................................................. C08J 11/04
(52) U.S. Cl. ..................................................... 521/49.8
(58) Field of Search ................................. 521/40, 49.8

(56) References Cited

U.S. PATENT DOCUMENTS 4,089,843 A * 5/1978 Rausch ......................... 260/65
4,496,711 A * 1/1985 Landis ........................ 528/125

* cited by examiner

Primary Examiner—Paul R. Michl
(74) Attorney, Agent, or Firm—McGuire Woods LLP

(57) ABSTRACT

The present invention relates to a method for recycling an alignment layer material. The recycled alignment layer material shows the same characteristics as an original alignment layer material. The waste solution of the alignment layer material produced during the liquid crystal display manufacturing processes is recycled by solidifying polyamic acids and soluble polyimides by putting a waste solution of the alignment layer material into an organic solution or ultra purified water in which the alignment layer material constituents of polyamic acids and soluble polyimides are insoluble, separating polyamic acids and soluble polyimides from the organic solvent or ultra purified water, and dissolving the separated solid polyamic acids and soluble polyimides into a solvent. Recycling the alignment layer material in this method can significantly reduce the manufacturing costs.

14 Claims, 3 Drawing Sheets

METHOD FOR RECYCLING ALIGNMENT LAYER MATERIALS

BACKGROUND OF THE INVENTION (a) Field of the Invention

The present invention relates to a method for recycling alignment layer materials, more particularly to a method for recycling alignment layer material components of polyamic acids (sometimes referred to as "PAA") and soluble polyimides (sometimes referred to as "sol. PI") by collecting alignment layer material waste solution massively produced in the LCD manufacturing process.

(b) Description of the Related Art

Liquid crystal responds differently to external forces such as electric fields according to the molecular arrangement. Therefore, the control of liquid crystal molecular alignment is very important for display component fabrication as well as for liquid crystal physical property research. However, it is difficult to obtain a uniform molecular arrangement by simply filling a gap between glass substrates with liquid crystal materials. Therefore, it is common to form an alignment layer on the glass substrate.

Although an alignment layer can be made primarily of inorganic or organic components and a mixture of both, organic materials are mainly used as a composition material of practical liquid crystal display components.

Since the introduction of SiO vacuum deposition suggested by Janning in 1972, the characteristics of liquid crystal materials have not been adversely affected by either the mass production of display components or the alignment control technology for liquid crystal display components. Hence an alignment control technology employing suitable organic polymers for mass production has been developed. Liquid crystal molecules are aligned by rubbing organic polymer layers formed on a glass substrate. The organic polymer layers are formed by a rotational coating method or a printing coating method, and then curing.

The rubbing method has been known since Mauguin observed in 1911 that the major axes of liquid crystal molecules become evenly aligned in a rubbed direction when glass substrates are rubbed in a certain direction by materials such as cloth, etc. Ever since then, despite the efforts devoted on the research for the rubbing methods and proper thin layer materials, a conclusive selection has not yet been made.

However, as high hydrolytic Schiff base liquid crystals are used since the beginning of the mass production of twisted nematic type LCD components, it has been essential that the glass frit sealing can secure the device reliability. Therefore, polyimide based materials were selected because it showed no problems in high temperature treatment. Thereafter, polyimide based materials have been proved to be superior to other organic polymers in all the aspects of printing, rubbing, alignment control, and chemical stability. Thus, polyimide based materials are widely used as alignment layer materials of various LCD components even today.

Generally, polyamic acids (PAA) or soluble polyimide (sol. PI) synthesize by reacting diamine and acid anhydride in a solvent. The printing material is polyamic acids or soluble polyimides, which become polyimide by drying, heating, and curing after printing.

The methods for forming an alignment layer using this polyimide include various methods such as spinning, spraying, dipping, printing methods, etc., as well as the printing method currently used most because of its compatibility with mass production processes.

However, the printing method has problems of high manufacturing costs because about 70% of the solution is wasted, i.e., not actually used in the alignment layer printing.

Additionally, treating waste alignment layer material also increases manufacturing costs.

SUMMARY OF THE INVENTION

Therefore, the present invention can reduce costs a lot by effectively recycling the waste alignment layer materials that are used in a liquid crystal display manufacturing process. Furthermore, it is an object of the present invention to provide a method for recycling the liquid crystal alignment layer materials that can reduce the waste disposal cost by remarkably decreasing the amount of the waste alignment layer materials.

The present invention provides a method for recycling alignment layer materials used for a liquid crystal display comprising steps of collecting waste solution of the alignment layer materials, solidifying polyamic acids and soluble polyimides by putting the above collected waste solution of alignment layer materials into an organic solvent or ultra purified water in which the alignment layer material constituents of polyamic acids and soluble polyimides are insoluble, and separating polyamic acids and soluble polyimides from the above organic solvent or ultra purified water in order to achieve the above object.

BRIEF DESCRIPTION OF THE DRAWINGS

The present invention will become more fully understood from the detailed description given herein below and the accompanying drawings.

DETAILED DESCRIPTION OF THE PREFERRED EMBODIMENTS

In the following detailed description, only the preferred embodiments of the invention have been shown and described, simply by way of illustrating the best mode contemplated by the inventor(s) of carrying out the invention. As will be realized, the invention may be modified in various obvious respects, all without departing from the invention. Accordingly, the drawings and the description are to be regarded as illustrative in nature, and not restrictive.

The present invention is described in detail below.

Figure 1:
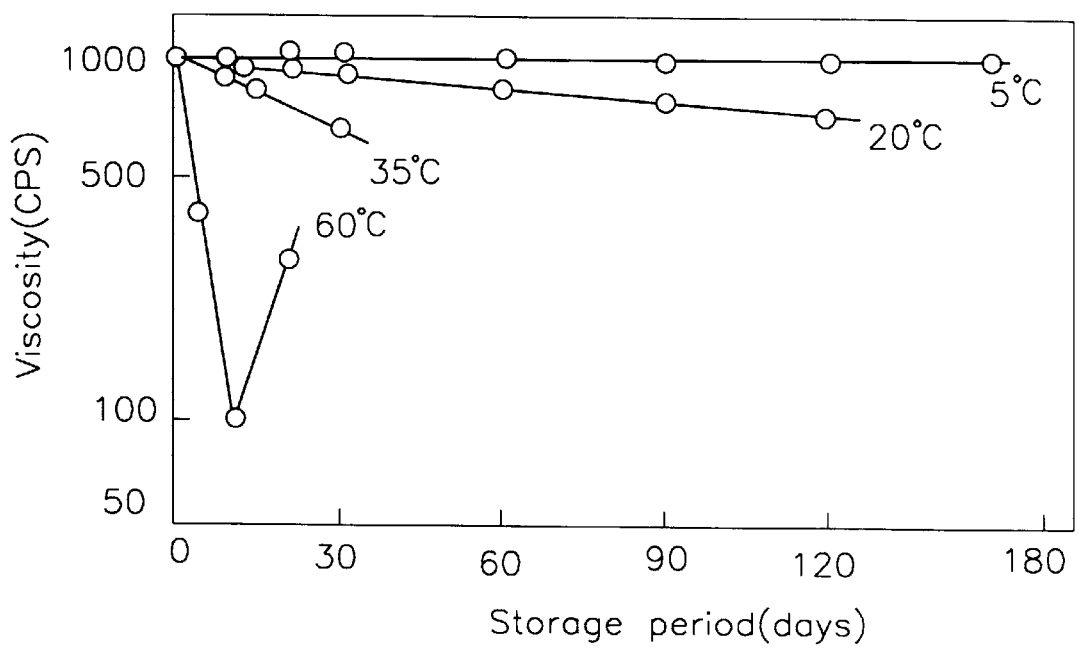
FIG. 1 is a graph that represents the viscosity variation of a liquid crystal alignment material according to temperature and storage period.

It is preferable not to mix foreign materials, like other solvents, with liquid crystal alignment materials while collecting a waste solution of alignment layer materials in the present invention. Separate pipes or devices can be used to prevent the introduction of foreign materials. Furthermore, it is preferable to maintain the waste solution at a temperature below 5° C. during collection, storage, and transportation of the waste solution of the alignment layer materials. FIG. 1 provides a graph that represents the viscosity variation of alignment materials depending on the temperature and storage period. Almost no viscosity variation appears at 5° C. in FIG. 1. A cooling bath or cooling jacket can be used in order to maintain such a temperature.

Figure 2:
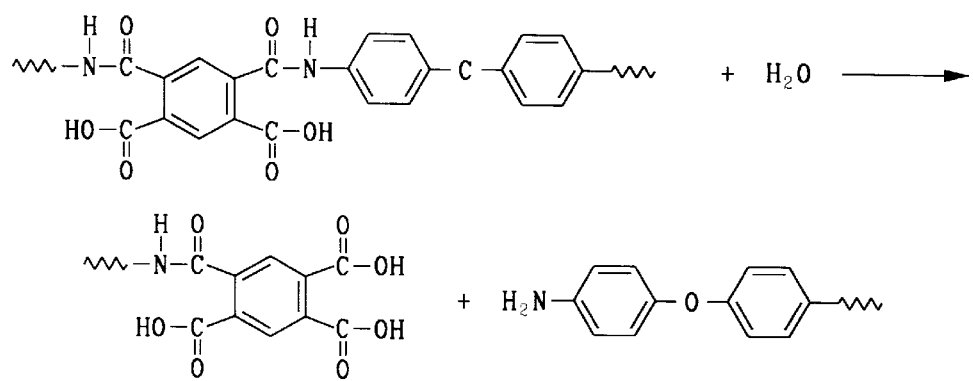
FIG. 2 represents a procedure in which hydrolysis occurs by the reaction of PAA and $H_2O$ shown in a chemical formula.
Figure 3:
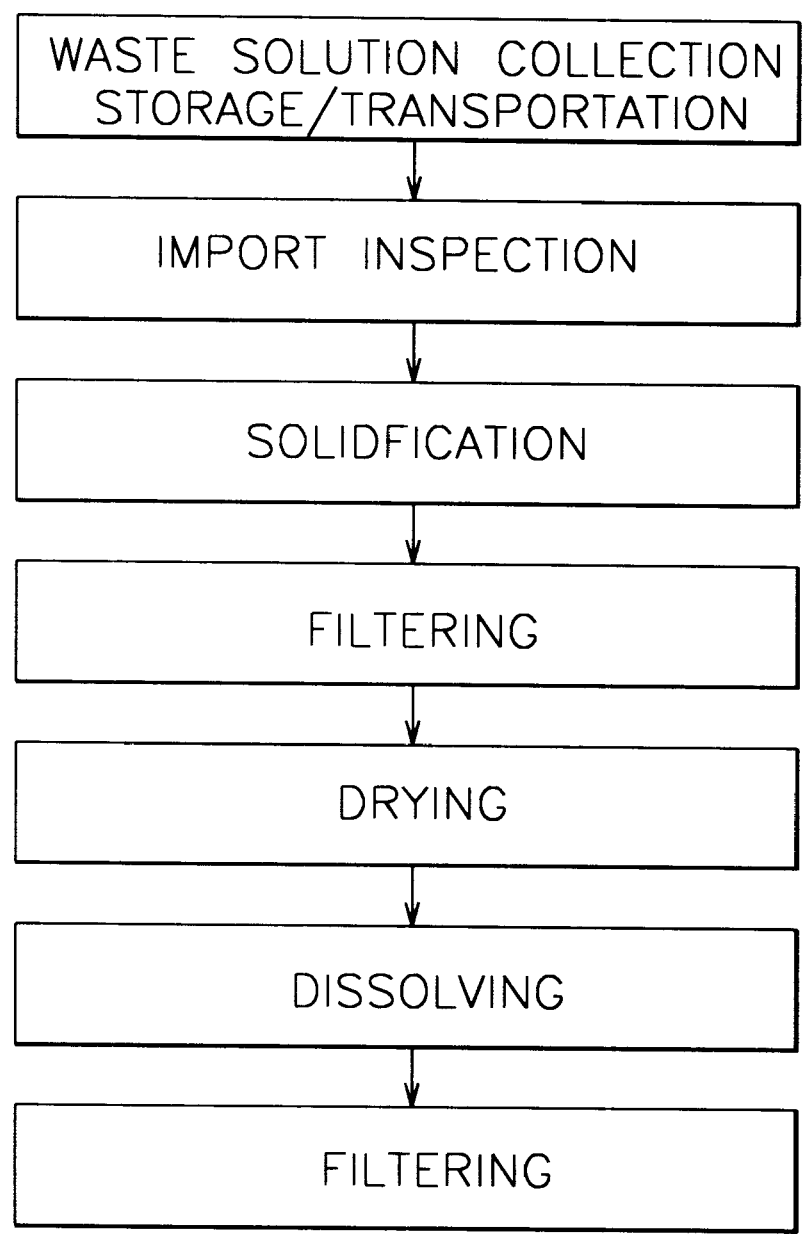
FIG. 3 represents a process diagram of a method for recycling the liquid crystal alignment materials according to EXAMPLE 1.

Furthermore, it is preferable to prevent the waste solution of liquid crystal alignment materials from contacting the moisture containing air since polyimide is hydrolyzed when contacting $H_2O$. FIG. 2 shows a chemical reaction formula that represents the reaction between polyamic acid and $H_2O$ resulting from the hydrolysis. Polyamic acid hydrolysis deteriorates the printing ratio by dropping the viscosity of alignment layer materials. The physical properties of the original solution of alignment layer material and the waste solution are compared in the following Table 1.

TABLE 1

| Samples | Moisture (%) | Viscosity (Cp) | Cl (ppm) | Solid content (%) |
|---|---|---|---|---|
| Original solution of alignment layer | 0.3 | 24.6 | Not detected | 5.0 |
| Waste solution of alignment layer | 3.3 | 19.2 | 14.3 | 4.9 |

As is represented in the above Table 1, the original solution of the alignment layer materials has a lower moisture content, higher viscosity, and lower chlorine.(Cl) content compared to a waste solution. The solid content percentages, however, are similar. As is represented in the above Table 1, the moisture affects the viscosity. So, the waste solution should be prevented from contacting the moisture containing air. It is preferable to blow $N_2$ gas in order to block air contact during the collection, storage, and transportation of the waste solution.

Furthermore, the present invention comprises the step of solidifying polyamic acids and soluble polyimides by putting the above collected waste solution of alignment layer materials into an organic solvent or ultra purified water in which polyamic acids and soluble polyimides are insoluble. In the preferred embodiment of the present invention, the organic solvent is preferably an ether group. The organic solvent or ultra purified water is consumed preferably over 17180 30 wt parts per 100 wt parts of the above waste solution of the alignment layer materials, and more preferably from 130 to 160 wt parts.

The present invention further comprises the step of separating polyamic acids and soluble polyimides from the above organic solvent. Although a filtering method is generally used for separation, other methods that can separate solids from solvent, such as centrifugal separating methods, can also be used.

Furthermore, the present invention can further comprise the step of washing and drying the filtered solid polyamic acids and soluble polyimides to remove any organic solvent from the solid polyamic acids and soluble polyimides. A vacuum oven is preferably used for drying.

Furthermore, the present invention comprises the steps of dissolving the above separated polyamic acids and soluble polyimides into a mixed solvent having the same composition as the original solution of the alignment layer materials. The recycled solid alignment layer material is dissolved into a solvent used for the original alignment layer material solution in order to make an alignment layer material solution, because the above separated polyamic acids and soluble polyimides are in a solid form. Polar solvents such as N-methyl-2-pyrrolidinone and/or γ-butyrolactone, etc. are used as solvent, and solvents with a low surface tension, such as cellosolve, etc., are generally mixed together in order to improve printability.

The EXAMPLES of the present invention are now described. However, the following EXAMPLES are only for illustrating the present invention and the present invention is not restricted to the following EXAMPLES.

EXAMPLE 1

After collecting a waste solution of alignment layer material produced in an LCD fabrication process through a pipe while maintaining the temperature below 5° C. and blowing in $N_2$ gas, polyamic acids and soluble polyimides were solidified by putting the collected waste solution of the alignment layer material into ultra purified water. And the solid polyamic acids and soluble polyimides were separated from ultra purified water by filtering the mixed solution of an organic solvent, polyamic acids, and soluble polyimides. After washing the above separated solid polyamic acids and soluble polyimides with distilled water, they were dried in a vacuum oven. After putting the dried solid polyamic acids and soluble polyimides into a solvent of the mixture of N-methyl-2-pyrrolidinone, γ-butyrolactone and cellosolve, it is heated to dissolve the solid polyamic acids and the soluble polyimides in order to produce recycled alignment layer material.

Test 1

Solid contents, viscosities, moisture contents, and metallic impurity contents were measured for the original alignment layer material solution, the recycled alignment layer material produced according to the above EXAMPLE 1, a waste solution of the alignment layer material that were simply collected after primarily used in the LCD fabrication process. The results of the above measurements are represented in Table 2.

TABLE 2

|  | Original solution | Waste solution | Recycled alignment layer materials |
|---|---|---|---|
| Solid content (wt %) | 4.93 | 5.27 | 5.13 |
| Viscosity (Cp) | 24.6 | 19.9 | 25.8 |
| Moisture content (%) | 0.25 | 4.58 | 0.34 |
| Metallic impurities (ppm) | Na <0.5 | Na 0.19 | Na 0.18 |
|  | Mg <0.5 | Mg 0.02 | Mg 0.04 |
|  | Al <0.5 | Al 0.05 | Al 0.06 |
|  | K <0.5 | K 0.02 | K 0.16 |
|  | Fe <0.5 | Fe 0.05 | Fe 0.10 |

The viscosity and moisture content properties of the alignment layer material are considered to be important in the LCD fabrication process. Table 2 indicates that the viscosity of the recycled liquid crystal alignment layer material is 25.8 Cp, which is far higher than 19.9 Cp of a waste solution and similar to the level of 24.6 Cp of the original solution. Additionally, the moisture content of the recycled alignment layer material was 0.34%, which is far less than the 4.58% of a waste solution and similar to the level of 0.25% of the original solution, as represented in the above Table 2. The above results show that the physical properties of the recycled alignment layer material of EXAMPLE 1 are equal to those of the original solution.

Test 2

The recycled alignment layer material produced in the above EXAMPLE 1 was applied in polyimide printing and rubbing processes so as to be compared with the original solution of the alignment layer material. Twenty-six (26) sheets were printed and none were rejected in the printing process. There were also no particular differences in the products of Example 2 from the printing results of the original solution in terms of leveling, edge lumps, drying, and pinhole ratios. The layer thickness was 665 angstrom in this Example, showing no particular difference from when the original solution is used. Furthermore, there were also no particular differences in eccentricity, leaning, polyimide lifting, and cloth contamination when compared with the results from using the original solution in the rubbing process. The above results show that the recycled alignment layer material is not different from the original alignment layer material.

A method for recycling alignment layer materials of the present invention can greatly reduce costs as well as reduce the environmental contamination by recycling the waste solution of the alignment layer material.

The method according to the present invention may be used not only for alignment layer materials for a liquid crystal display, but also for any other semiconductor device manufacturing process. Thus, the present invention is not limited to manufacturing a liquid crystal display and can be used for any semiconductor device.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for recycling an alignment layer material, comprising steps of:
    collecting a waste solution of alignment layer material using a transferring pipe and raw material container equipped with an apparatus that prevents air from contacting the waste solution of the alignment layer material and with a cooling apparatus that cools the waste solution of the alignment layer material;
    solidifying polyamic acids and soluble polyimides by putting the collected waste solution of the alignment layer material into an organic solvent or ultra purified water in which the alignment layer materials of polyamic acids and soluble polyimides are insoluble;
    separating polyamic acids and soluble polyimides solidified from the organic solvent or ultra purified water, washing and drying the separated polyamic acids and soluble polyimides; and
    dissolving the washed and dried polyamic acids and soluble polyimides into a mixed solvent of the same composition as what is used for the original solution of the alignment layer material,
    wherein the waste solution of the alignment layer material is collected at a temperature of below 5° C.,
    wherein the organic solvent or the ultra purified water is consumed equal to or more than 130 wt parts per 100 wt parts of the waste solution of the alignment layer material.

2. The method of claim 1, wherein the polyamic acids and soluble polyimides are separated by filtering from the organic solvent or ultra purified water.

3. The method of claim 1, wherein the cooling apparatus is a cooling bath or a cooling jacket.

4. The method of claim 1, wherein the waste solution of the alignment layer material is collected while blowing $N_2$ gas during collection, storage and transportation of the waste solution.

5. The method of claim 1, wherein the organic solvent is an ether group.

6. The method of claim 1, the separated polyamic acids and soluble polyimides are dried in a vacuum oven.

7. A method for recycling polyamic acid and polyimide, comprising steps of:
    collecting a waste solution of polyamic acid and polyimide;
    solidifying polyamic acid and soluble polyimide by putting the collected waste solution of the alignment layer material into an organic solvent or ultra purified water in which liquid crystal alignment materials of polyamic acid and soluble polyimide are insoluble; and
    separating polyamic acid and soluble polyimide solidified from the organic solvent or ultra purified water,
    wherein the waste solution of the alignment layer material is collected at a temperature of below 5° C.,
    wherein the organic solvent or the ultra purified water is consumed equal to or more than 130 wt parts per 100 wt parts of the waste solution of the alignment layer material.

8. The method of claim 7, further comprising a step of dissolving the separated polyamic acid and soluble polyimide into a mixed solvent of the same composition as what is used for the original solution of an alignment layer material.

9. The method of claim 8, wherein the waste solution of polyamic acid and polyimide is collected using a transferring pipe and raw material container having a cooling apparatus.

10. The method of claim 9, wherein the transferring pipe and raw material container are further equipped with an apparatus that can prevent air from contacting the waste solution of the alignment layer material.

11. The method of claim 10, wherein the polyamic acid and soluble polyimide are separated by filtering from the organic solvent or ultra purified water.

12. The method of claim 10 wherein the cooling apparatus is a cooling bath or a cooling jacket.

13. The method of claim 10, wherein the waste solution of polyamic acid and polyimide is collected while blowing $N_2$ gas during collection, storage and transportation of the waste solution.

14. The method of claim 11, wherein the organic solvent is an ether group.

* * * * *